United States Patent [19]

Duemmler

[11] Patent Number: 5,294,033
[45] Date of Patent: Mar. 15, 1994

[54] CROSS-SECTIONAL CONFIGURATION OF A ROOF LUGGAGE CARRIER OF A VEHICLE

[75] Inventor: Stephan Duemmler, Im Jochert, Fed. Rep. of Germany

[73] Assignee: Votex, GmbH, Dreieich, Fed. Rep. of Germany

[21] Appl. No.: 848,760

[22] Filed: Mar. 10, 1992

[30] Foreign Application Priority Data

Mar. 13, 1991 [DE] Fed. Rep. of Germany ....... 4108059

[51] Int. Cl.$^5$ ............................................... B60R 9/00
[52] U.S. Cl. .................................... 224/316; 224/322; 224/326
[58] Field of Search ................ 224/309, 316, 321, 322, 224/324, 325, 326, 329, 330, 331

[56] References Cited

U.S. PATENT DOCUMENTS 560,046  7/1984  Bott .
4,501,385  2/1985  Bott ........................... 224/319

Primary Examiner—Linda J. Sholl
Attorney, Agent, or Firm—Cort Flint

[57] ABSTRACT

The invention relates to a cross-sectional configuration of a transverse girder (1) on a roof luggage carrier of a vehicle. According to the invention, the outer surfaces are symmetric in relation to a vertical longitudinal plane (2) of the transverse girder. The underside (3) is substantially a flat, horizontal lower surface (b) facing towards the vehicle roof. The upper width (a) of the transverse girder (1) is smaller than (b). The upper side (4) and the underside (3) are connected via convexly curved and rounded lateral surfaces (5, 6). Relationships and ratios of width and curvatures provide improved aerodynamic characteristics and a reduction of the noise level caused by wind according to the invention.

9 Claims, 1 Drawing Sheet

CROSS-SECTIONAL CONFIGURATION OF A ROOF LUGGAGE CARRIER OF A VEHICLE

BACKGROUND OF THE INVENTION

The invention relates to the cross-sectional configuration of a transverse girder on a roof luggage carrier of a vehicle.

Roof luggage carriers are generally made of transverse girders placed crosswise over the roof which are held and supported on support legs on the sides of the roof. In conventional vehicles the support legs are attached by means of tensioning clamps to the rain gutters of the roof. In modern, aerodynamically optimized vehicles, no roof gutters are provided so that other and more expensive designs with support plates and tensioning clamps are required (DE-OS 34 06 431). Furthermore vehicles, in particular utility vehicles and off-the-road vehicles with a roof railing consisting of railing pipes extending o either side of the roof are known. In that case too, roof luggage racks consist of transverse girders which are connected to the railing pipes through tensioning devices.

In all of the above-mentioned designs of roof luggage carriers transverse girder are used as bearing rails extending above and at a distance from the vehicle roof at a right angle to the direction of travel.

Conventional transverse girder have cross-sections with square or rectangular profiles (DE-PS 35 16 483; DE-PS 31 04 163) or with round profiles (DE-PS 35 10 805). Obviously the aerodynamic characteristics of a vehicle are generally affected by such transverse girder extending at a right angle to the direction of travel above the vehicle roof. Also travel noise is generally increased due to the unfavorable flow of the oncoming air around the transverse girder.

Particularly unfavorable conditions exist with the usual, square or rectangular cross-sectional configurations of the transverse girder, where strong eddy currents at the edges cause an especially high noise level during rapid travel. The performance of the known round cross-sections is not much better.

In order to improve this situation, a known device (DE-OS 36 07 856) provides a cross-section for the transverse girder that is egg-shaped or drop-shaped. A better aerodynamic form with a reduction of the noise level is achieved. Further measures to improve the aerodynamic characteristics consist in providing forms that merge into each other in a flat surface between transverse girder and supporting legs, and by providing covering caps on the supporting legs.

With the above-described egg-shaped or drop-shaped cross-section the symmetrical axis is horizontal above the roof of the vehicle, with the arc of least curvature pointing in the direction of travel. The arc with the greatest curvature, i.e. with the shortest curvature radius, is pointed to the back of the vehicle. Due to an essentially symmetrical form with respect to a horizontal plane, approximately the same amount of arriving air is, in principle, deflected above and below the transverse girder profile. Especially the air flow deflected down towards the roof causes relatively loud wind noises to be produced even with this profile configuration. In order to obtain a stable profile with a suitably high bearing capacity, an extruded profile with a vertical standing continuous inner wall is provided.

Accordingly, an object of the present invention consists in achieving further improvement of the vehicle's aerodynamic characteristics and reducing the noise level on an installed roof luggage carrier by means of a suitable cross-sectional configuration of the transverse girder.

SUMMARY OF THE INVENTION

The above object is accomplished according to the present invention by providing a transverse girder for a vehicle luggage carried having a rounded outer profile cross-section that is not symmetric in relation to a horizontal plane, but is symmetrical in relation to a vertical longitudinal plane of the transverse girder. The underside of the transverse girder is mostly a flat horizontal underside surface. An underside of a certain lower width faces towards the vehicle roof. The upper side of the transverse girder is also kept relatively flat and has a certain upper width. The upper side and the underside of the transverse girder are connected by convexly curved and rounded lateral surfaces. The width of the underside is greater than the width of the upper side of the transverse girder. It has been shown that a width ratio of the underside and the upper side according to the following equation is especially favorable:

$$\frac{a}{b} = \frac{1}{1.5 \text{ to } 3}$$

where a is the width of the upper side and b the width of the underside.

By ensuring that the underside towards the vehicle roof is wider than the upper side of the transverse girder, a better air flow around the transverse girder is achieved. This contributes to improved aerodynamic characteristics and to the lowering of the noise level.

In a further embodiment of the invention, the convexly curved lateral surfaces, when seen in a cross-section, have a first arc with a sharp curvature, and a relatively small curvature radius, coming from the underside and extending laterally to the outside. A second arc has a lesser curvature, i.e. with a longer curvature radius than the first arc zone starts from the upper side and also extends laterally to the outside. The first arc zone and the second arc merge into each other continuously, whereby a "point of return" is defined at the meeting point or transition on either side of the transverse girder. This point of return determines the width of the cross-section.

The arc curvatures should are selected in such manner that the points of return are situated at a height of 15% to 40% of the entire height of the transverse girder as measured from the underside (base line) of said transverse girder. These points of return are therefore lower than the middle of the height of the transverse girder profile, so that a greater amount of the arriving air stream is guided over the transverse girder than beneath said transverse girder. In modern vehicles with relatively low wind and air flow noises the flow acts mostly upon the surface of the roof. Additional roof structures with the above-mentioned configuration of the transverse girder should disturb this airflow which acts upon the roof as little as possible, so that the air flowing behind the transverse girder profile is to be guided for as long as possible (in function of the profile height) at essentially a parallel to the vehicle roof. This is achieved among other things through the relatively low position of the "points of return" on the transverse girder profile.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
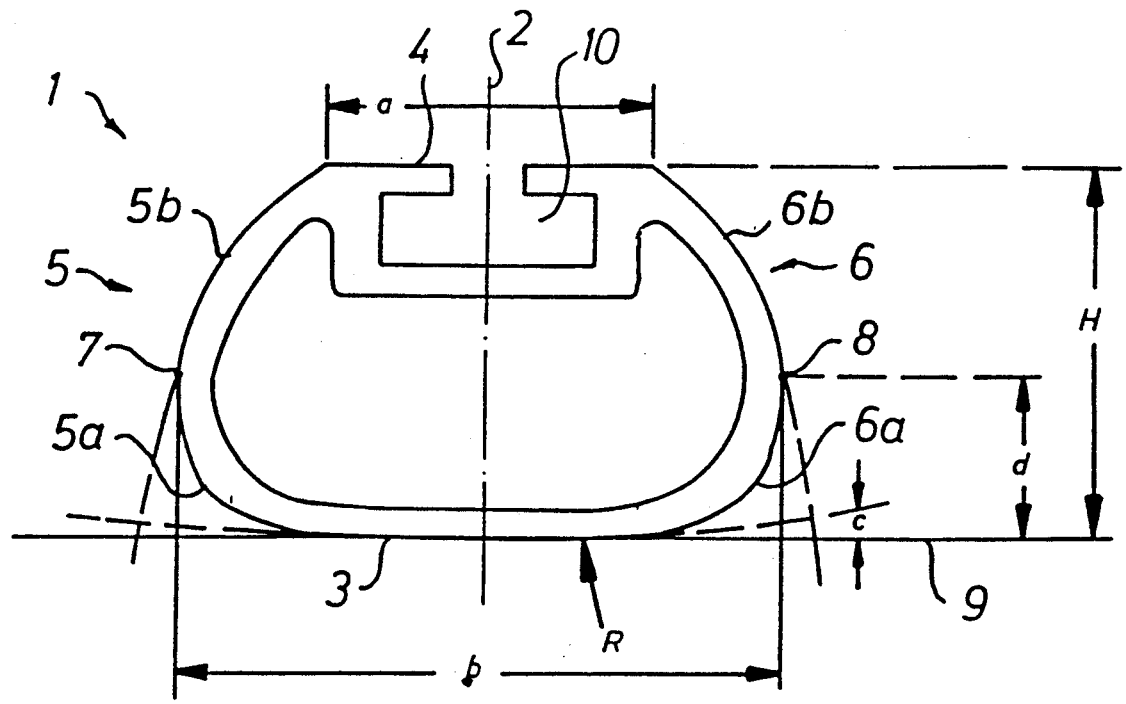
FIG. 1 illustrates a schematic representation of a cross-sectional configuration of a transverse girder of a roof luggage carrier according to the invention.
Figure 2:
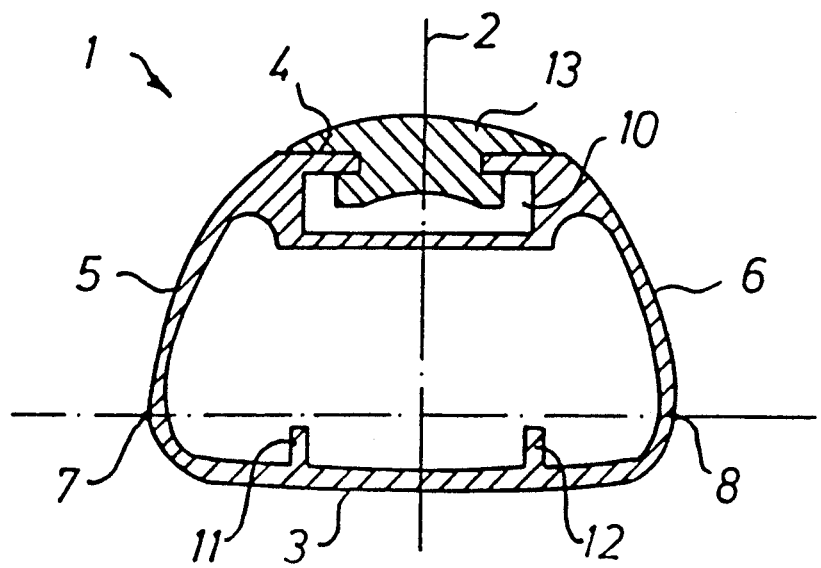
FIG. 2 illustrates a cross-section through an embodiment of a transverse girder according to FIG. 1.

Referring now in more detail to the drawing, FIG. 1 shows a cross-sectional configuration of a transverse girder 1 for a roof luggage carrier, having outer surfaces which are symmetrical in relation to a vertical longitudinal plane 2. An underside 3 of the transverse girder 1 is mostly flat, and has a width of the girder facing towards the vehicle roof (not shown) is designated as "b". The width of the upper side 4 of the transverse girder 1 is referenced "a". The width "b" is visibly greater than the width "a".

The width ratio of the upper side to the underside is preferably selected according to the following equation:

$$\frac{a}{b} = \frac{1}{1.5 \text{ to } 3}$$

The upper side 4 and the underside 3 of the transverse girder 1 are connected via convexly curved and rounded lateral surfaces 5 and 6. Starting from the underside 3, each lateral surface extends with a first arc 5a, 6a laterally to the outside having a sharp curvature, and small curvature radius. Correspondingly, a second arc 5b, 6b, with a lesser curvature and longer curvature radius, extends from the upper side 4.

The first arc 5a, 6a and the second arcs 5b, 6b continuously merge into each other to define a "point of return" 7, 8 for the transition points on both sides of the transverse girder 1. These points of return also define the width projection of the transverse girder "b" which is a projection of the transverse girder facing towards the vehicle roof at the points of return. The curvatures are selected so that the points of return 7, 8 are located at a height "d" as measured from a base line 9, and that this height "d" represents 25% to 40% of the overall profile height "H".

The underside of the transverse girder includes a convexly curved lower surface having a third arc with a relatively large radius of curvature "R". The first arcs have a smaller radius of curvature and continue from the third arc on either side of the third arc. The third arc faces the vehicle roof with a chord height "C" of 0 to 5 mm as measured from a straight horizontal base line. Preferably, transverse girder 1 has a hollow profile, and includes inner reinforcement ribs 11, 12. Transverse girder 1 includes a longitudinal upper channel 10 with undercuts 4 and a cover 13 which covers the upper channel and which is engaged by the undercuts.

While a preferred embodiment of the invention has been described using specific terms, such description is for illustrative purposes only, and it is to be understood that changes and variations may be made without departing from the spirit or scope of the following claims.

What is claimed is:

1. A transverse girder for a roof luggage carrier of a vehicle having outer surfaces that are rounded as seen in cross-section providing improved aerodynamic characteristics and lower wind noise, wherein said transverse girder comprises:

a cross-sectional configuration that includes outer surfaces which are symmetrical in relation to a vertical longitudinal plane of said transverse girder;

an upper side and an underside of said transverse girder having a relatively flat horizontal surface;

said upper side and said underside of said transverse girder being connected by convexly curved and rounded lateral surfaces; and said transverse girder having a width projection facing towards the vehicle roof which is greater than a width of said upper side of said transverse girder facing away from said vehicle roof;

said convexly curved lateral surfaces including a first arc with a relatively large curvature starting at said underside and extending to an outer side; and a second arc with a lesser curvature than said first arc which extends from said upper side laterally to said outer side;

said first arc and said second arc continuously merging into each other to define points of return at a transition point on either side of the transverse girder defining a transverse girder width; and said points of return are located at a height (d) representing about 25% to 40% of a height (H) of the transverse girder measured from said underside of said transverse girder.

2. The device of claim 1, wherein a width ratio of said upper side to said transverse girder is selected according to the following equation:

$$\frac{a}{b} = \frac{1}{1.5 \text{ to } 3}$$

where "a" is the width of the upper side and "b" is the width projection of said transverse girder.

3. The device of claim 1 wherein said underside of said transverse girder includes a convexly curved lower surface having a third arc with a relatively large curvature; and said first arcs continue from said third arc on either side of said transverse girder.

4. The device of claim 3 wherein said third arc faces said vehicle roof with a chord height of about 0 to 5 mm as measured from a straight horizontal base line.

5. The device of claim 1 wherein said transverse girder has a hollow profile and includes inner reinforcement ribs.

6. The device of claim 1 wherein said transverse girder includes a longitudinal upper channel with undercuts; and a cover which covers said upper channel which is engaged by said undercuts.

7. A transverse girder for a roof luggage carrier of a vehicle having outer surfaces that are rounded as seen in cross-section providing improved aerodynamic characteristics a low wind noise, wherein said transverse girder comprises:

a cross-sectional configuration that includes outer surfaces which are symmetrical in relation to a vertical longitudinal plane of said transverse girder;

an upper side and an underside of said transverse girder having a generally horizontal surface;

said upper side and said underside of said transverse girder being connected by convexly curved and rounded lateral surfaces;

said convexly curved lateral surfaces including a first arc with a relatively sharp curvature starting at said underside and extending to an outer side; a second arc with a lesser curvature than said first arc which extends from said upper side laterally to said outer side;

said first arc and said second arc of said curved lateral surfaces continuously merging into each other to define points of return at a transition point on either side of the transverse girder defining a transverse girder width; and a width ratio of said upper side to said transverse girder is selected according to the following equation:

$$\frac{a}{b} = \frac{1}{1.5 \text{ to } 3}$$

where "a" is the width of the upper side and "b" is a width projection of said transverse girder facing towards said vehicle roof at said points of return; and said points of return are located at a height (d) representing about 24% to 40% of a height (h) of the transverse girder measured from said underside of said transverse girder.

8. The device of claim 7 wherein said transverse girder has a hollow profile and includes inner reinforcement ribs.

9. The device of claim 7 wherein said transverse girder includes a longitudinal upper channel with undercuts; and a cover which covers said upper channel which is engaged by said undercuts.

* * * * *